US009262371B2

(12) United States Patent
Finnerty et al.

(10) Patent No.: US 9,262,371 B2
(45) Date of Patent: Feb. 16, 2016

(54) SYSTEM FOR MONITORING MULTIPLE BUILDING AUTOMATION SYSTEMS

(71) Applicant: Siemens Industry, Inc., Alpharetta, GA (US)

(72) Inventors: Shaun Finnerty, Chicago, IL (US); Jeffrey Hriljac, Port Barrington, IL (US); Drew M. Knobloch, Austin, TX (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 447 days.

(21) Appl. No.: 13/631,893

(22) Filed: Sep. 29, 2012

(65) Prior Publication Data
US 2014/0095654 A1    Apr. 3, 2014

(51) Int. Cl.
| G06F 15/16 | (2006.01) |
| G06F 15/173 | (2006.01) |
| G05B 15/02 | (2006.01) |
| G05B 15/00 | (2006.01) |
| G05B 11/01 | (2006.01) |

(52) U.S. Cl.
CPC .......... *G06F 15/17306* (2013.01); *G05B 15/02* (2013.01); *G05B 2219/25168* (2013.01); *G05B 2219/2642* (2013.01)

(58) Field of Classification Search
CPC ..................... G05B 15/02; G05B 2219/25168; G05B 2219/2642; G05B 19/042; G05B 2219/25057; G06F 15/17306
USPC ................................ 709/203, 217; 700/1, 17
See application file for complete search history.

(56) References Cited

U.S. PATENT DOCUMENTS

| 5,784,608 A | * | 7/1998 | Meske, Jr. ............... H04L 67/30 |
| 5,793,966 A | * | 8/1998 | Amstein ............. G06F 17/3089 |
| | | | 707/E17.116 |

(Continued)

FOREIGN PATENT DOCUMENTS

| GB | 2430499 A | 3/2007 |
| WO | 00/48376 A1 | 8/2000 |
| WO | 00/62136 A1 | 10/2000 |

OTHER PUBLICATIONS

PCT Search Report dated Jan. 27, 2014, for Application No. PCT/US2013/062231. (18 pages).

*Primary Examiner* — David Lazaro
*Assistant Examiner* — Vitali Korobov

(57) ABSTRACT

A method for execution on a computing device includes transmitting first identification information to a server processing circuit via the Internet. The server processing circuit identifies a plurality of geographically dispersed systems corresponding to the first identification information. Information including geographical coordinates and system status information is received for each system. A set of geographical boundary coordinates are determined. Moreover, a visible characteristic value for each system is determined based on the corresponding system status information. A map presentation function executed by a second processing circuit displays a map based on the geographic boundary coordinates, and displays a plurality of visible indicators on the map. Each of the plurality of visible indicators has a position on the map corresponding the geographical coordinates of a corresponding system. Each of the plurality of visible indicators has a visible characteristic corresponding to the visible characteristic value of the corresponding system.

13 Claims, 11 Drawing Sheets

(56) References Cited

U.S. PATENT DOCUMENTS

| | | | | |
|---|---|---|---|---|
| 6,487,457 B1 * | 11/2002 | Hull | ............ | G05B 15/02 700/17 |
| 6,510,350 B1 * | 1/2003 | Steen, III | ............ | G05B 15/02 700/9 |
| 6,598,056 B1 * | 7/2003 | Hull | ............ | G05B 15/02 |
| 2003/0078677 A1 * | 4/2003 | Hull | ............ | G05B 15/02 700/1 |
| 2003/0093465 A1 * | 5/2003 | Banerjee | ............ | G06F 17/30569 709/203 |
| 2004/0021687 A1 | 2/2004 | Wobben | | |
| 2008/0109175 A1 | 5/2008 | Michalak | | |
| 2012/0054125 A1 | 3/2012 | Clifton | | |
| 2012/0179567 A1 * | 7/2012 | Soroca | ............ | G06Q 30/08 705/26.3 |

* cited by examiner

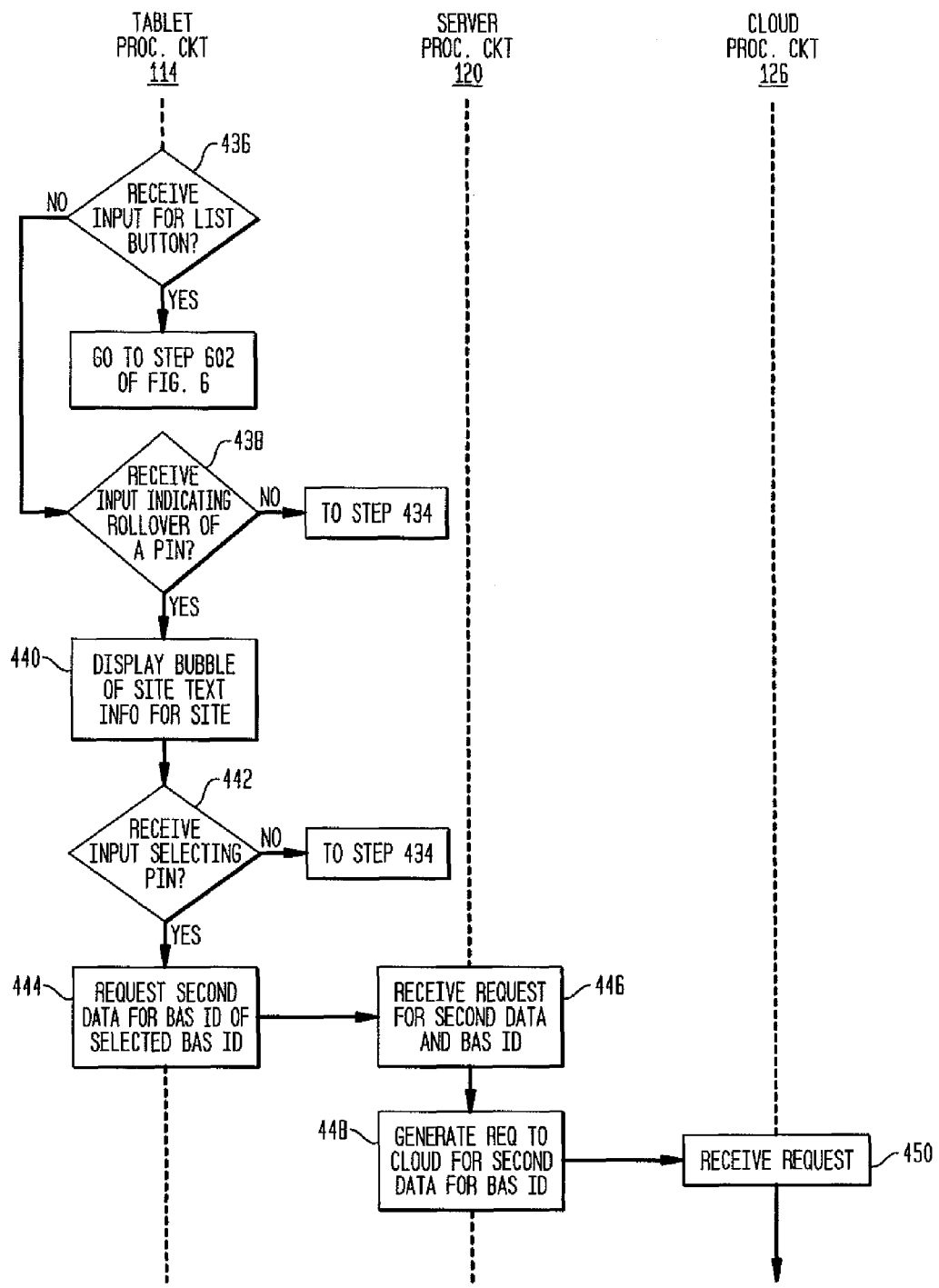

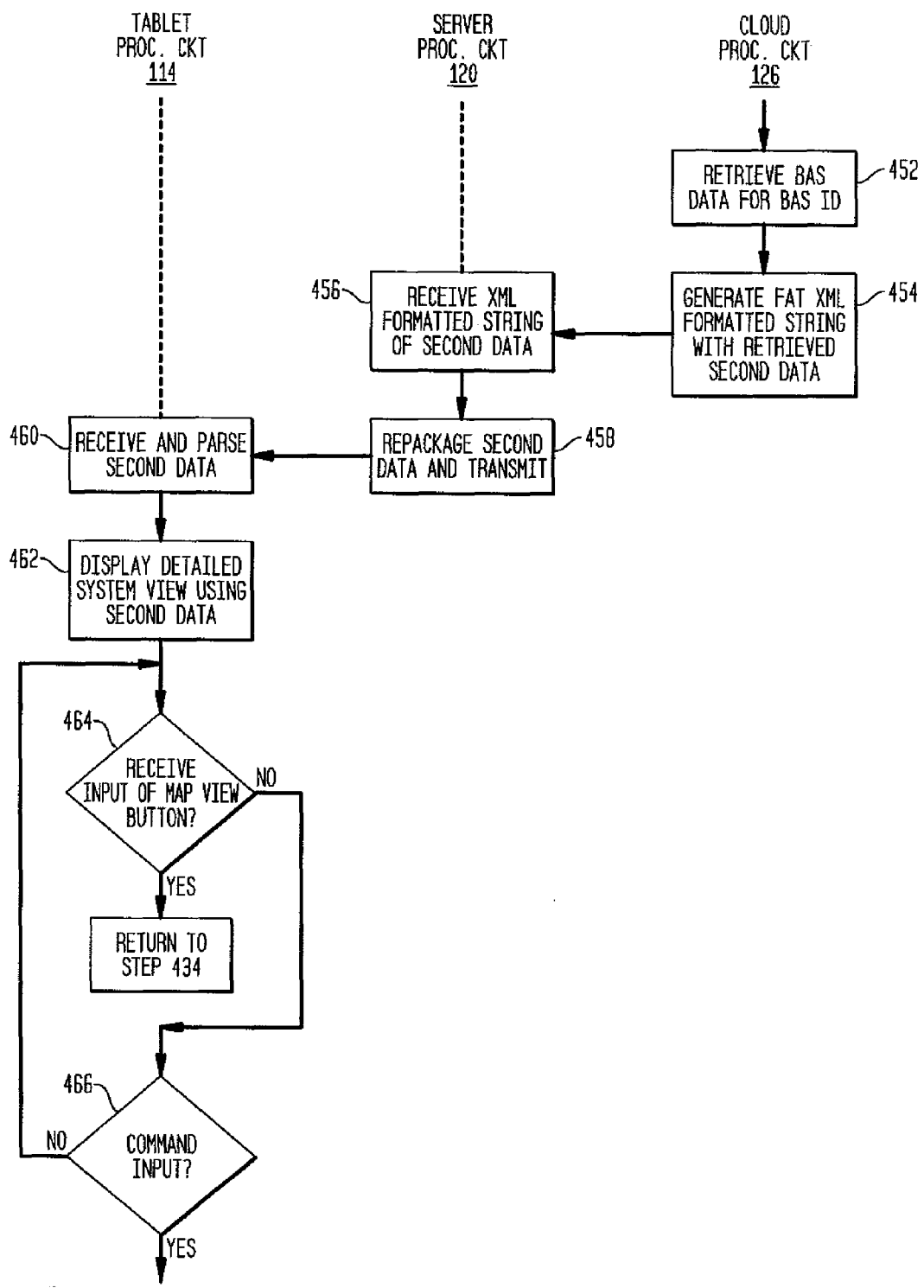

SYSTEM FOR MONITORING MULTIPLE BUILDING AUTOMATION SYSTEMS

FIELD OF THE INVENTION

The present invention relates to building automation systems, and in particular, for user interface methods and apparatus for building automation systems.

BACKGROUND

Building automation systems include lighting systems, security systems, fire safety systems, and comfort control systems, also known as heating, ventilation and air conditioning (HVAC) systems. Such systems can include controllers, valves, ventilation damper boxes, ductwork, sensors, and air handing equipment. In larger buildings with hundreds or thousands of such components, building automation systems include distributed control systems and communication networks.

In order to monitor and control these distributed control systems, larger building automation systems often incorporate a centralized user interface to the system. The centralized user interface is part of a centralized system control station, which may be the form of a desktop computer. The control station communicates with various elements of the building automation system to allow retrieval of data therefrom, and the provision of control commands thereto. Many control stations, such as the INSIGHT™ model control station available from Siemens Building Systems, allow a user in one location to monitor, supervise, command, and analyze building system data from systems that can include thousands of data points. Such control stations can further provide an interface to the Internet that allows for remote monitoring and control of a building automation system.

For small building systems, such as those located in fast food restaurants or other similar establishments, the building automation systems are much less complex. In such systems, it is neither practical nor necessary to implement a full computer-based control station. Instead, a data interface panel can provide sufficient control and monitoring functionality. Nevertheless, even with the simplicity of small systems, it is still desirable to provide Internet accessibility. Accordingly, small data interface panels with an Internet interface have been developed for this purpose. In particular, the model Ecoview™ energy management system available from Siemens Industry, Inc. includes building system control components designed for smaller facilities. One of the components is a touch screen data panel that provides a user interface to the system. This touch screen data panel also includes Internet connectivity. In one configuration, the touch screen data panel is configured to provide system data to a data server in a cloud computing network. As a consequence, the system data may be accessed remotely over the Internet from the cloud.

While ability to access system data for small businesses over the Internet is helpful, there nevertheless exists a need for more efficient ways of accessing building system data, particularly for smaller facilities that lack sophisticated on-site computer control stations.

SUMMARY

The present invention adds to the efficiencies of managing building system data by providing a system in which a user may obtain an overall graphic map view of a plurality of systems on a mobile computing device. In some embodiments, at least some status information regarding each of the plurality of systems is displayed on the graphic map view. In this manner, an owner of multiple establishments or distributed systems, or a facility manager of multiple establishments or systems, may conveniently assess status information from, and provide control commands to, any of a plurality of systems in an intuitive manner.

A first embodiment includes a method for execution on a computing device. The method includes transmitting first identification information to a server processing circuit via the Internet. The server processing circuit identifies a plurality of systems corresponding to the first identification information. The method also includes receiving from the server processing circuit, via the Internet, information for each of the plurality of systems, such information including, but not limited to, geographical coordinates and system status information corresponding to each of the plurality of building systems. The method further includes determining a set of geographical boundary coordinates defining a geographical area containing a plurality of the geographical coordinates, and determining for each system a visible characteristic value based on the corresponding system status information. The method also includes employing a map presentation function executed by a second processing circuit to display a map based on the geographic boundary coordinates, and to display a plurality of visible indicators on the map. Each of the plurality of visible indicators has a position on the map corresponding to the geographical coordinates of a corresponding system. Each of the plurality of visible indicators has a visible characteristic corresponding to the visible characteristic value of the corresponding system.

The features and advantages of the embodiments described herein will become more readily apparent to those of ordinary skill in the art by reference to the following detailed description and accompanying drawings.

BRIEF DESCRIPTION OF THE DRAWING

FIGS. 4A-4E show portions of the flow diagram of FIG. 4;

DETAILED DESCRIPTION

Figure 1:
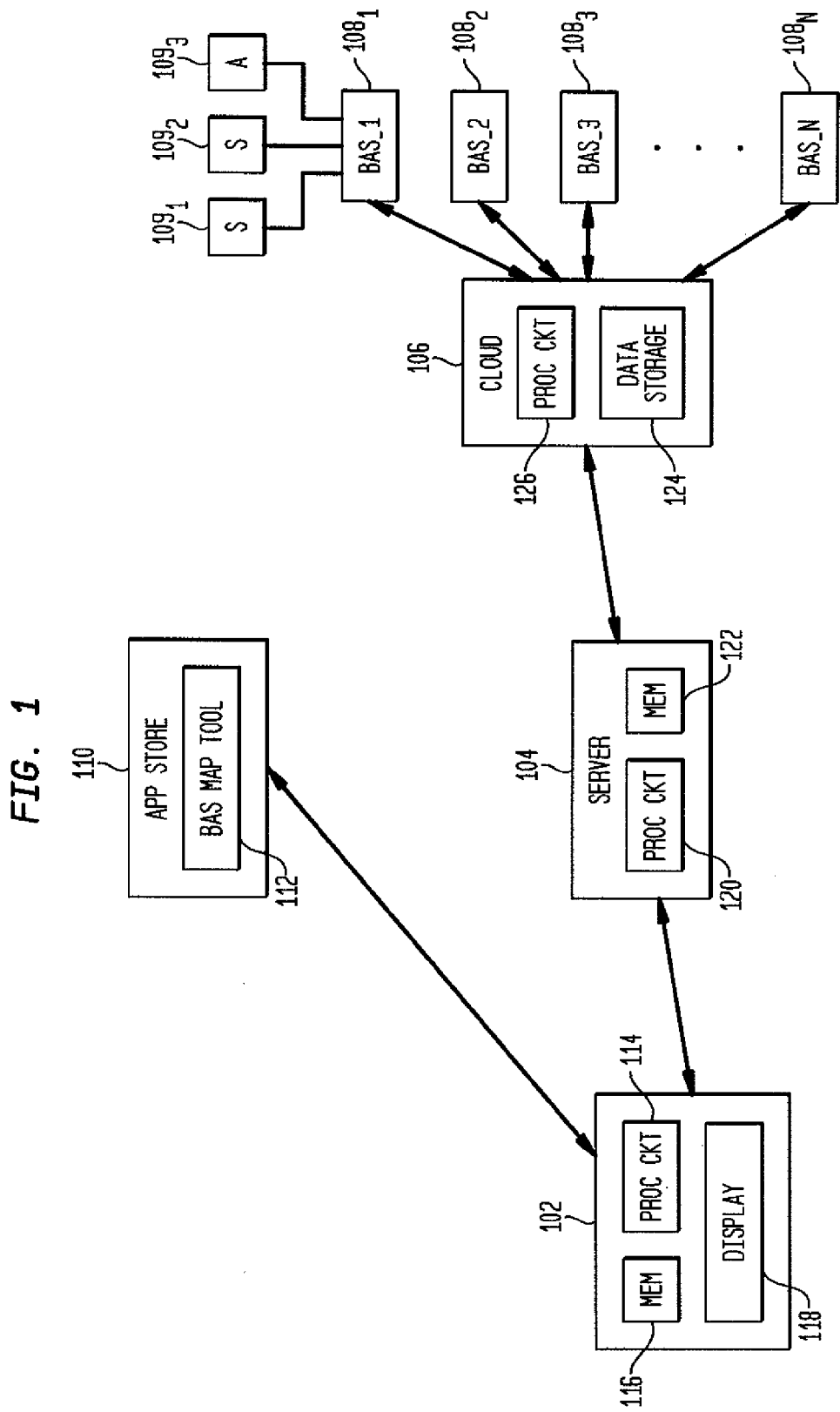
FIG. 1 is a schematic block diagram of an exemplary system for displaying information regarding a plurality of building systems in accordance with one or more embodiments of the invention.

FIG. 1 shows a block diagram of a system 100 for displaying information regarding a plurality of building systems in which exemplary embodiments of the invention may be employed. In general, the system 100 includes at least a first wireless tablet computer 102a, a server computer 104, a clustered computing environment or cloud 106, and a plurality of n BAS control stations $108_1$, $108_2$, $108_3$, . . . $108_n$. The arrangement 100 further includes an application store 110 that stores, for download, a building automation system (BAS) mapping tool 112. It will be appreciated that in some environments, the BAS mapping tool 112 may be stored at, and downloaded from, the server computer 104 instead of (or in addition to) the application store 110.

Each of the BAS control stations $108_1$, $108_2$, $108_3$, ... $108_n$ is associated with a corresponding BAS in one of a plurality of locations. Each of the BAS control stations $108_1$, $108_2$, $108_3$, ... $108_n$ operates to provide monitoring and supervisory control over the corresponding BAS. For example, the BAS control station $108_1$ is operably connected to two sensors $109_1$, $109_2$ and an actuator $109_3$ of a BAS. The BAS control station $108_1$ is configured to provide control over the actuator $109_3$ responsive to, among other things, temperature values received from the two sensors $109_1$, $109_2$. Such operations are conventional.

Each BAS control station $108_1$ ... $108_n$ is an Internet-enabled data interface device that is configured to report BAS data periodically to the cloud 106 for storage and subsequent accessibility. Such BAS control stations are known, and may include, for example, the touch screen panel of EcoView™ model energy management system available from Siemens Industry, Inc.

It will be appreciated that in other embodiments, the BAS control stations $108_1$, $108_2$, $108_3$, ... $108_n$ may be replaced with other controllers/monitoring equipment of other distributed systems, such as web-based controllers in industrial automation systems, or controllers of office equipment or the like.

Referring again to the embodiment of FIG. 1, the tablet computer 102a is operably coupled to the server 104 and the application store 110 via a suitable data connection, such as the Internet. Similarly, the server 104, as well as the BAS control stations $108_1$ ... $108_n$, are operably connected to the cloud 106 via the Internet.

The tablet computer 102a is an end user computing device that is in a portable tablet form. For example, the tablet computer 102a may suitably be a model iPad available from Apple Inc. However, it will be appreciated that the tablet computer 102a may take other forms. In addition, it will be appreciated that instead of a tablet computer 102a, a suitably equipped "smart phone", for example, the iPhone available from Apple Inc., or mini-tablet device, such as the iTouch, available from Apple Inc., may be used. In still another embodiment, the tablet computer 102a may be replaced by an ordinary desktop or laptop computer with Internet access and a web client.

Figure 2:
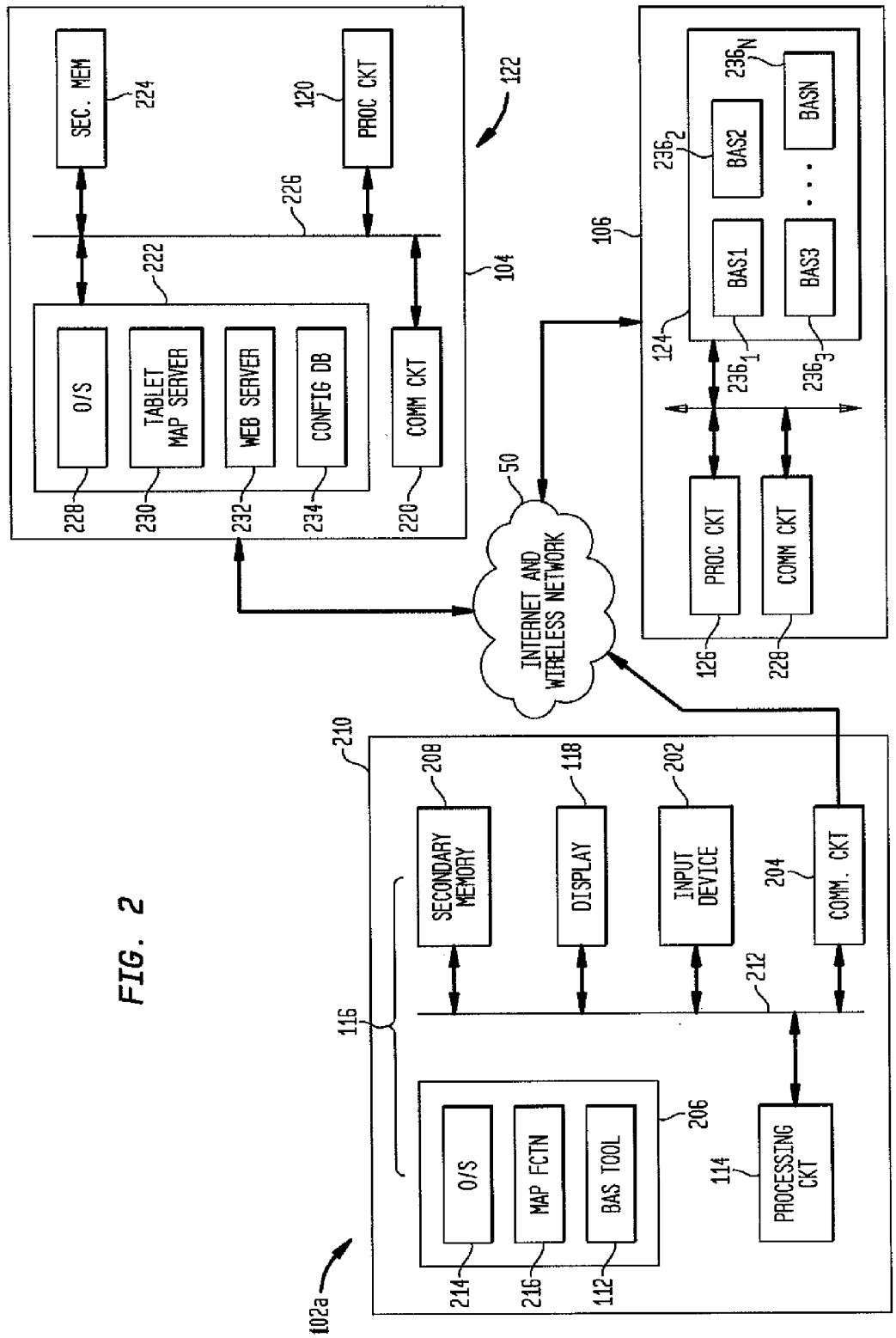
FIG. 2 is a further detailed schematic block diagram of an exemplary arrangement within the system of FIG. 1 that includes a user computing device, a server, and a cloud computing system.

Referring again to the embodiment of FIG. 1, the tablet computer 102a includes, among other things, a processing circuit 114, a memory 116, and a display 118. As shown in FIG. 2, the tablet 102a further includes an input device 202 and a communication circuit 204. As also shown in FIG. 2, the memory 116 includes a primary memory 206 and secondary storage 208. All of the above listed elements of the tablet computer 102a are supported on or in a tablet housing 210 having dimensions generally associated with conventional portable tablet computers, not more than approximately 8" by 11". However, the housing 210 may take other forms, and indeed may be significantly smaller or larger.

The primary memory 206, which may include RAM, stores programming instructions including those for the operating system 214 and a map function 216. In the embodiment of FIG. 2, the primary memory 206 further stores the BAS mapping tool application 112 when being executed by the processing circuit 114. With the exception of the BAS mapping tool application 112, the remaining elements of the tablet 102a are conventional in commercially available table computers. Thus, for example, the display 118 and the input device 202 are integrated into a conventional touch-screen display system. Also conventional is the secondary memory 208, which comprises non-volatile data storage, such as a solid state hard-drive, flash memory, non-volatile RAM, or the like.

It will be appreciated that as depicted in FIG. 2, the BAS mapping tool 112 has already been downloaded from the application store 110 of FIG. 1, and has already been loaded into primary memory 206 for execution. When the tablet 102a is not executing the BAS mapping tool 112, it may suitably be stored in the secondary memory 208.

The processing circuit 114, the primary memory 206, the secondary memory 208, the display 118, the input 202 and the communication circuit 204 are all operably coupled by one or more communication busses 212. The processing circuit 114 is configured to execute the operating system 214 and the map function 216 stored in the primary memory 206. Once downloaded, the processing circuit 114 is further configured to execute the BAS mapping tool application 112. The processing circuit 114 is operably coupled via the bus 212 to receive user input signals from the user input device 202, and to generate screen displays that are visible on the display 118. The processing circuit 114 is also configured to communicate signals to remote computers and devices via the Internet (including any intermediate wireless networks) using the communication circuit 204.

The operating system 214 as described herein includes appropriate interface software for receiving Internet data, including that of the World Wide Web, and inherently includes web browser software capable of, when executed by the processing circuit 114, requesting, receiving and rendering web pages.

The communication circuit 204 preferably includes a wireless transceiver configured to communicate wirelessly with an access point to the Internet. For example, the communication circuit 204 may be configured to communicate wirelessly through a wireless area network to an Internet connection device, or via a 3G or 4G network to an Internet gateway. Such wireless communication circuits are readily available and are typically pre-installed in commercially available tablet (and other) computing devices.

Referring again to FIG. 1, the server 104 is a general purpose computer server system configured to communicate via the Internet, and to host a web server, and in accordance with this embodiment, provide data to be consumed in a mapping tool service, as will be discussed further below. As shown in FIG. 1, the server 104 includes a processing circuit 120 and a memory 122 to carry out the functions described herein.

FIG. 2 shows the server 104 in further detail. As shown in FIG. 2, in addition to the processing circuit 120 and memory 122, the server 104 includes a communication circuit 220 configured to communicate with remote devices over a network which can include, directly or indirectly, the Internet. As also shown in FIG. 2, the memory 122 includes primary memory 222 and a secondary memory 224. The processing circuit 120 is operably coupled to the primary memory 222, the secondary memory 224 and the communication circuit 220 via a communication bus 226. The processing circuit 120 is configured to execute programming instructions stored in the primary memory 222, as will be discussed further below, and to communicate information with remote devices via the communication circuit 220.

The primary memory 222 includes an operating system 228, a mapping server 230, a web server 232, and a user configuration database 234. The mapping server 230, when executed by the processing circuit 120, provides a service to one or more mapping tool clients, such as the tablet 102a executing the mapping tool 112. The operations of the service are described further below in connection with FIG. 4. The web server 232 provides an interface from the mapping server 230 to exchange information with clients over the World Wide Web. The function and construction of the web server 232 are conventional in this regard.

Figure 5:
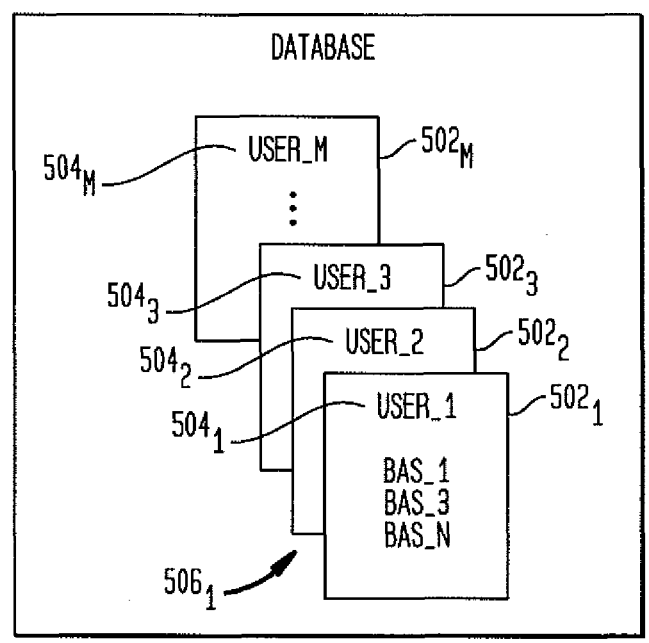
FIG. 5 shows a representative diagram of a configuration database employed in the arrangement of FIG. 2.

The user configuration database 234 is a database that, in essence, identifies the system data, which in the example of FIG. 1 is BAS data, that each user can access. FIG. 5 shows a representative diagram of an exemplary user configuration database 234. The database 234 in one embodiment includes user records $502_1, 502_2, \ldots 502_m$. Each record $502_x$ includes user identification information $504_x$ and BAS or system identification information $506_x$. The system identification information $506_x$ identifies one or more systems from which the user identified in the user identification $504_x$ may access data. It will be appreciated that the implementation details of the database 234 can employ any convention database system. The system identifiers $506_x$ may suitably constitute any data string or value that corresponds uniquely to a system (such as a BAS). As shown in FIG. 5, a first record $502_1$ associates user identification information $504_1$ (USER_1) with system identifiers $506_1$ (BAS_1, BAS_3 and BAS_N). Thus, in this example, a user having the identification USER_1 would be able to access data from BAS's associated with the system identifiers BAS_1, BAS_3 and BAS_N.

Referring again to FIG. 1, the cloud 106 is a network of data servers and other devices that store data received over the Internet, and which is made available over the Internet, in predefined structure of security and accessibility. The cloud 106 generally includes large amounts of data storage 124 and a network of server processors, referred to herein simply as a processing circuit 126. Because cloud computing is generally known, the structural and operational details of the cloud 106 are omitted for purposes of clarity of exposition. However, as shown in FIG. 2, the cloud 106 generally includes, in addition to the processing circuit 126 and the data storage 124, a communication circuit 228. As is known in the art, the processing circuit 126 is configured to receive data from a plurality of remote devices (via the Internet and communication circuit 228), store the received data in the data storage 124, and allow retrieval of the stored data by a plurality of remote devices (via the Internet and communication circuit 228).

As will be discussed further below in detail, the data storage 124 stores data records $236_1 \ldots 236_n$ associated with each of the plurality of BAS control stations $108_1 \ldots 108_n$ of FIG. 1. As discussed above, each BAS control station $108_x$ is an Internet-enabled data interface device that is configured to report BAS data periodically to the cloud 106 for storage and subsequent accessibility.

Referring again to FIG. 1, the general operation of the system 100 involves two basic functions. In a first function, each of the building automation systems $108_1$, $108_2$, $108_3, \ldots 108_n$ provides BAS system status information to the cloud 106 for storage. In a second function, a user employs the tablet 102a to access at least some of the BAS status information from the cloud 106 via the server 104. One user may have access to data from several BAS's. For example, the owner of multiple fast food franchises could have access to the BAS data from each of the franchise locations. In accordance with this embodiment, the tablet 102a presents the BAS status information for each of the accessed BAS control stations $108_1 \ldots 108_n$ using an indicator superimposed on a displayed map. Each indicator includes a summary indication of the corresponding system's status. The user may then employ the input device 202 of the tablet 102a to obtain further data corresponding to a select one of the BAS control stations $108_x$.

Figure 3A:
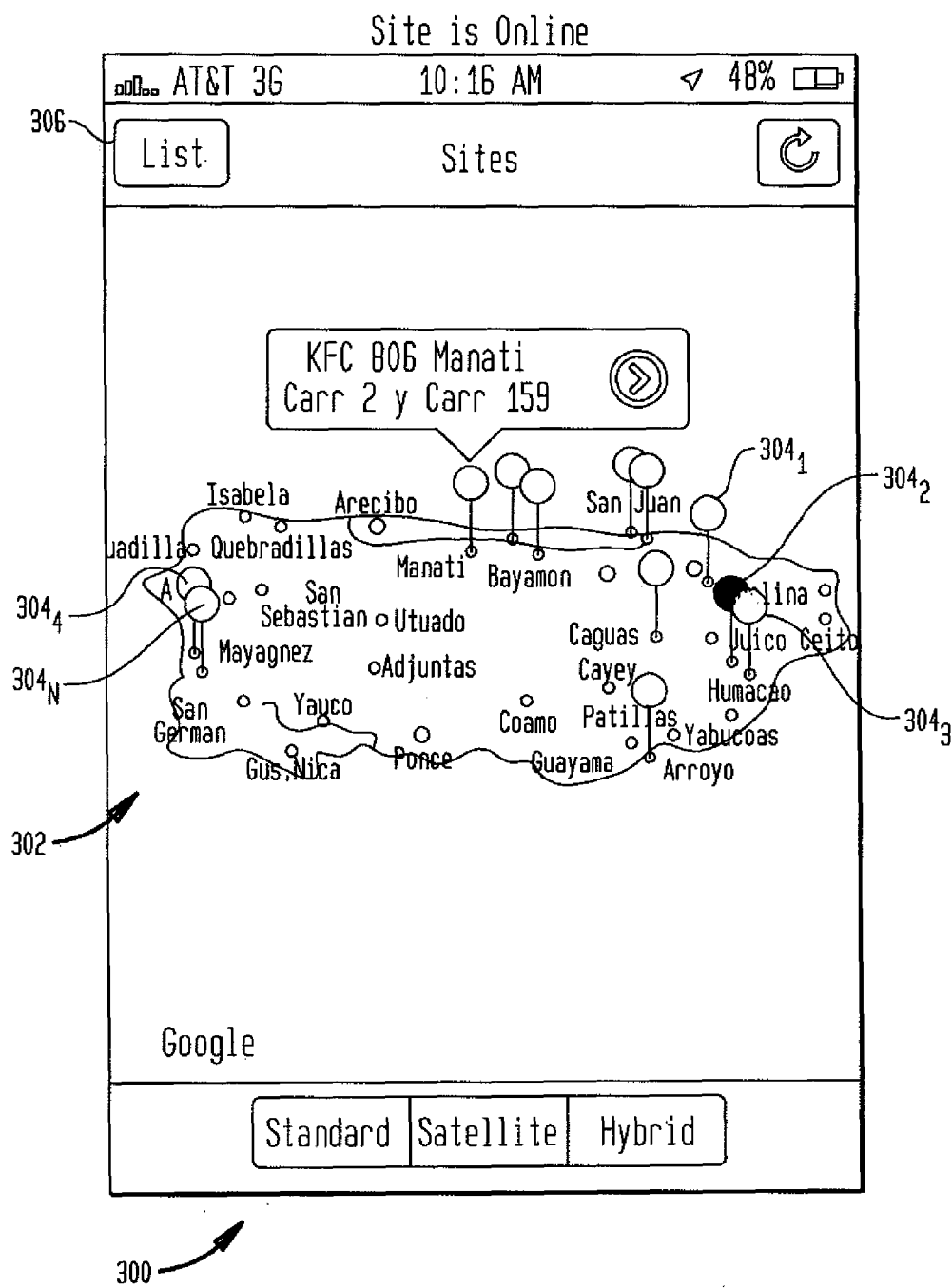
FIGS. 3A-3B show exemplary display screens generated by the computing device of the arrangement of FIG. 2.

FIG. 3A shows, for example, an exemplary display screen 300 generated by the arrangement 100. The display screen 300 represents the appearance of the display 118 of the tablet 102a. The display screen 300 includes a map 302, a plurality of pins $304_1, 304_2 \ldots 304_n$. The locations of the pins $304_1, 304_2 \ldots 304_n$ on the map 302 represents the real-life location of a corresponding BAS to which the user has access. Thus, in this example, user has access to each BAS associated with one of the pins $304_1, 304_2 \ldots 304_n$. In the embodiment described herein, the pins $304_1, 304_2 \ldots 304_n$ further include a visual characteristic (e.g. color or shading) representative of a status of the corresponding BAS. In this example, the all of the pins $304_1 \ldots 304_n$ except for pin $304_2$ have the same visual characteristic, which indicates that the corresponding BAS is operational. The pin $304_2$, however, has a different color or shading, which indicates that the BAS is offline, or otherwise requires attention.

It will be appreciated that in various embodiments, different colors or shading levels or types can indicate any of a plurality of conditions that may be of interest to the user. For example, in addition to indicating online, offline, and general trouble status via different colors or shades of the pins $304_1 \ldots 304_n$, some systems can include colors specifically indicating power usage that exceeds a predetermined level.

It will further be appreciated that in embodiments involving other types of distributed systems, as opposed to building automation systems, specific desirable status values of those systems may readily be mapped to different shading or coloring of the pins $304_1 \ldots 304_n$.

The display screen 300 also includes a selectable "list" button 306 which allows the user to toggle to a different display screen, not shown, that contains a text list including the identification of each of the BAS's to which the user has access, and status information, and one or more additional values from each BAS.

It will also be appreciated that each of the pins $304_1, 304_2 \ldots 304_n$ is a selectable element on the display screen 300 that can be selected to cause display of detailed data from a particular BAS. For example, if a user selects the pin $304_1$, then a new display will be generated showing detailed data from the BAS that corresponds to the pin $304_1$. An example of such a display of detailed BAS data is discussed below in connection with FIG. 3B.

Figure 3B:
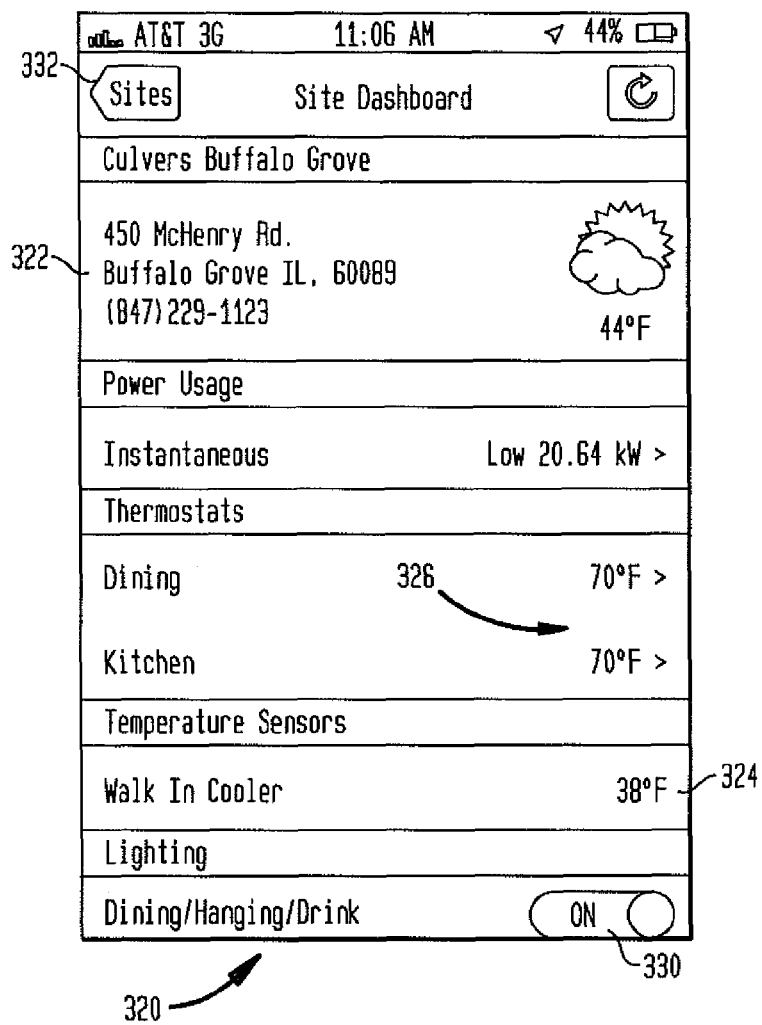

More specifically, FIG. 3B shows an exemplary display screen 320 of a detailed system view provided on the display 118 of the tablet 102a responsive to the selection of one of the pins $304_1, 304_2 \ldots 304_n$ of the display screen 300 of FIG. 3A. As shown in FIG. 3B, the detailed system view display screen 320 includes a display of data including the BAS site street address 322, one or more internal temperature measurements 324, one or more thermostat or temperature set points 326, power usage 328, and lighting (on/off) status 330. It will be appreciated that the display screen 320 may also display any alarm indicators, not shown, such as those indicating an out-of-range temperature, or indicating that the site has gone offline. The detailed data may also provide the user with an ability to command points. For example, lighting status 330 graphic or element may allow the user to select and change the status. Similarly, the set point temperature values 326 may be selected, thereby enabling a dialog box to change the value. The display screen 320 further includes a button 332 that allows the user to toggle back to the map view display 300 as shown in FIG. 3A.

As illustrated by this example, the system 100 provides the user with an efficient graphical map display (display screen 300) providing access to further data from each of a plurality of building automation systems via a wireless tablet device 102a. The system 100 allows the user to obtain detailed data (see display screen 320), and even command points, for any site selected from the graphical map display.

Further detail regarding how the system 100 operates to provide the graphical interfaces illustrated in FIGS. 3A and 3B is provided with reference to FIGS. 1, 2 and 3. Referring to FIG. 1, each of the BAS control stations $108_1$, $108_2$ ... $108_n$ from time to time communicates BAS system data to the cloud 106. To this end, each BAS control station $108_x$ obtains BAS data from its site, such as lighting status (on/off), temperature, alarms, fan status (on/off) and in some cases, power usage. The BAS control station $108_x$ communicates such data to the cloud 106 in a markup string, such as a fat XML string. Referring to FIG. 2, the processing device 126 of the cloud 106 causes the BAS data received from each BAS control station $108_x$ to be stored in a corresponding file $236_x$ in memory.

Thus, with simultaneous reference to FIGS. 1 and 2, the BAS data from the BAS control station $108_1$ is stored in the data file $236_1$ in the cloud data store 124, the BAS data from the BAS control station $108_2$ is stored in the data file $236_2$, and so forth.

The reporting and storage of data from the BAS control stations $108_1$ ... $108_n$ preferably occurs independent of the operation of the server 104 and the tablet 102a. The BAS control stations $108_1$, $108_2$, ... $108_n$ continue to update their respective data records $236_1$, $236_2$, ... $236_n$ in an ongoing fashion. The frequency and/or timing of the updates may be configured within the BAS control stations $108_1$, $108_2$, ... $108_n$. A typical time between updates is 15 minutes.

Referring now to the operation of the tablet 102a, the user initially downloads the BAS mapping tool 112 from the application store 110. Referring to FIG. 2, the user downloads the application by providing appropriate input to the user input device 202 to establish a communication session with the application store 110 via the communication circuit 204. The communication circuit 204, in turn, communicates with the application store 110 via the Internet and any intervening wireless networks in a conventional manner. In the download operation, the communication circuit 204 receives the BAS mapping tool 112 and the processing circuit 114 causes it to be stored in the memory 116, such as in the secondary storage 208. The user may thereafter invoke the BAS mapping tool 112 by selecting an appropriate icon or application name displayed on the display 118, using the input device 202. Once selected, the tablet processing circuit 114 operates as described below.

Figure 4:
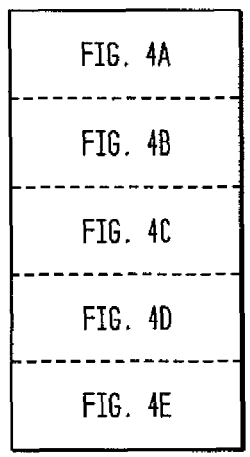
FIG. 4 shows a flow diagram of an exemplary set of operations that may be carried out by the arrangement of FIG. 2.
Figure 4A:
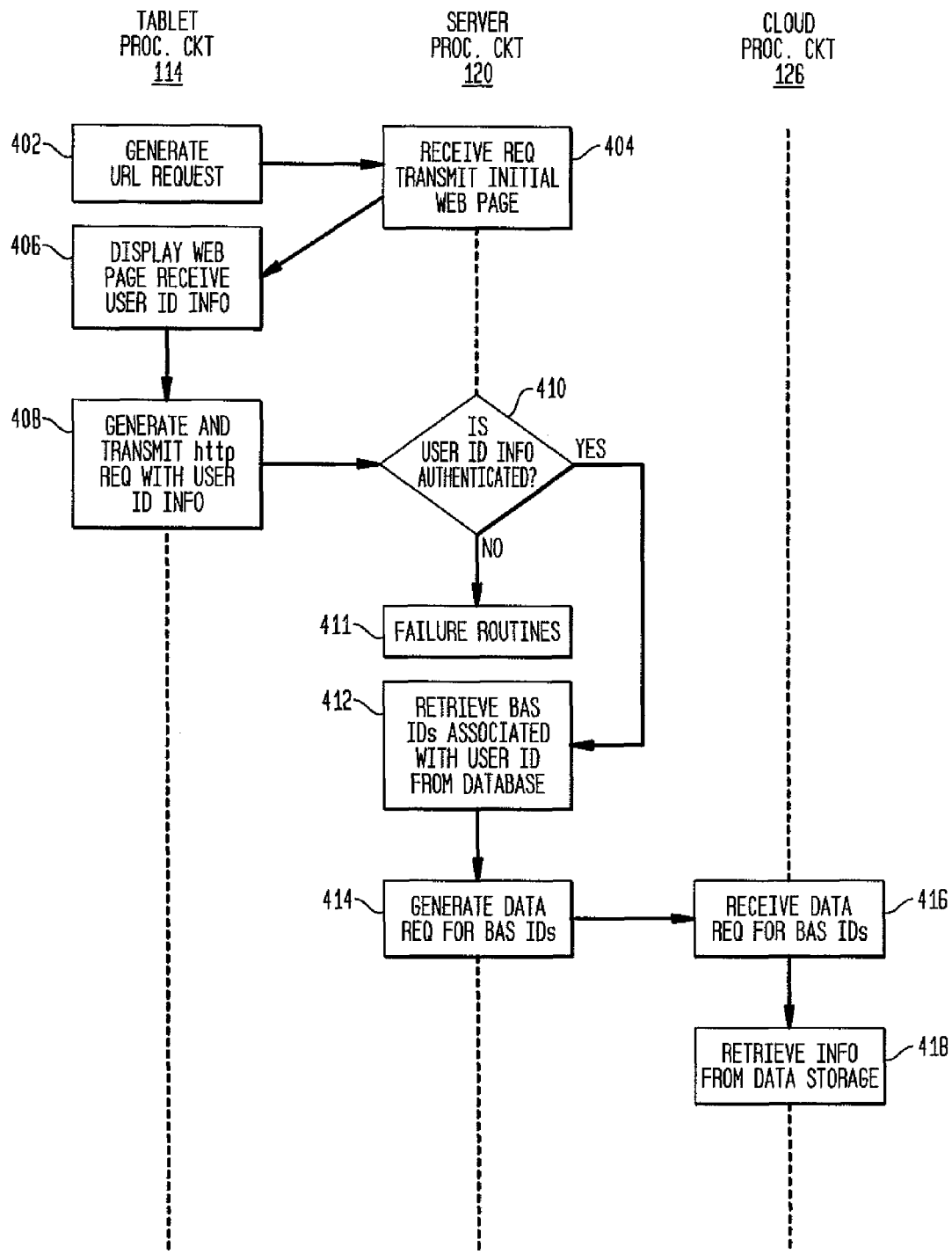
Figure 4B:
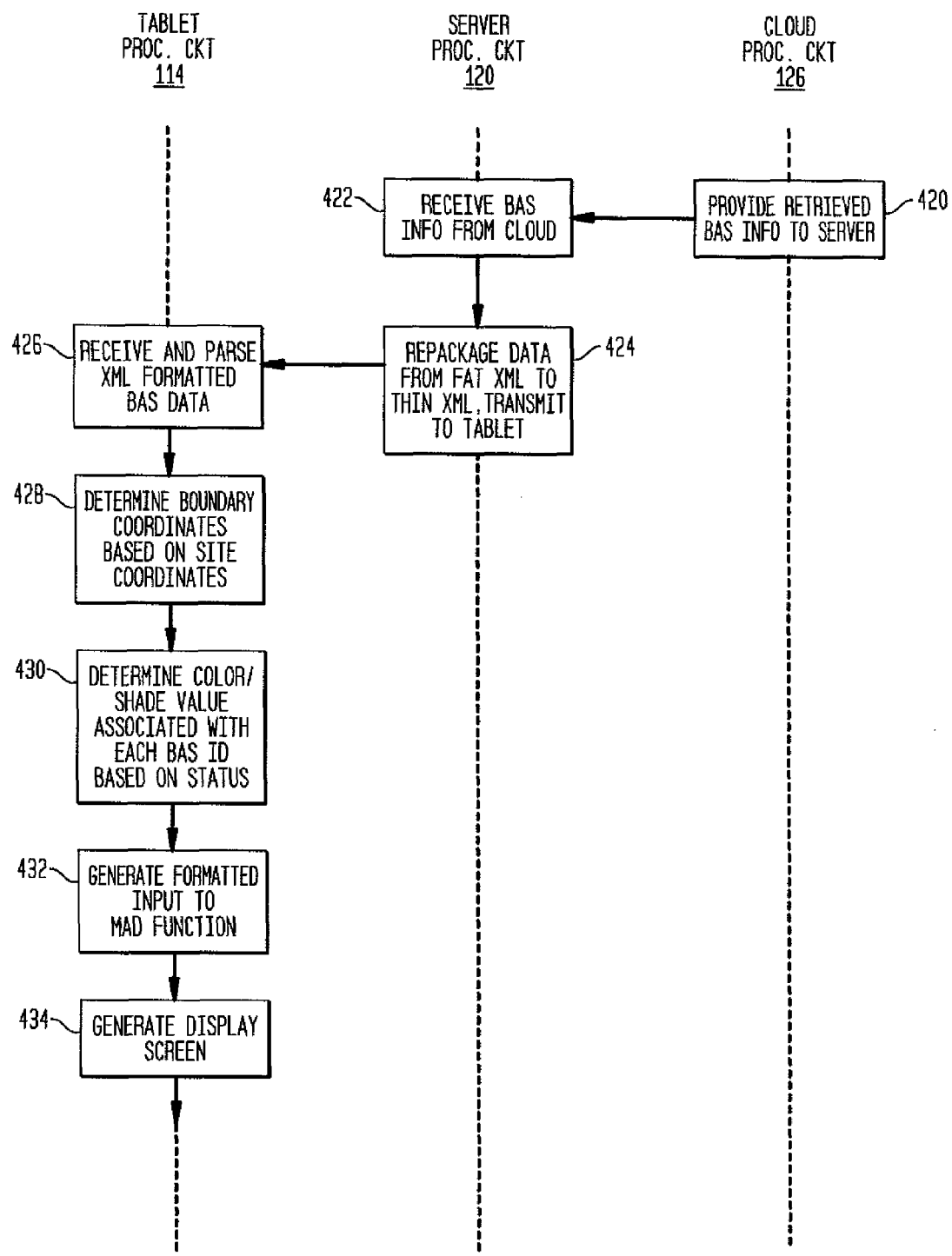
Figure 4E:
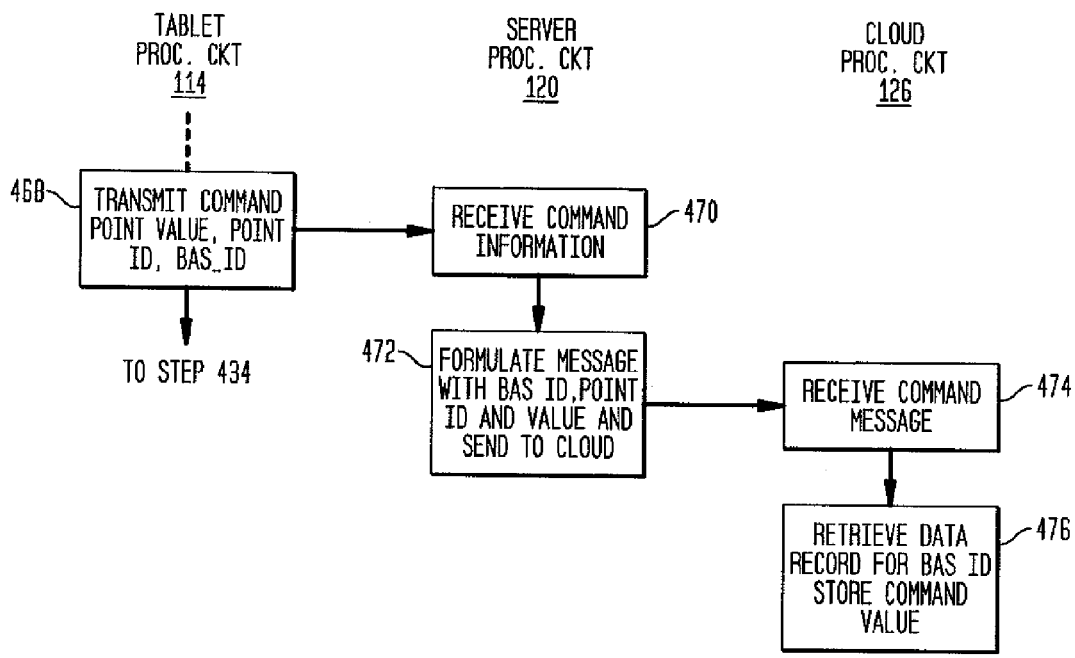

In particular, FIG. 4 shows a set of operations of the system 100, and more particularly, the tablet 102a, the server 104 and the cloud 106, which provide a map-based user interface to system data of one or more building systems according to the invention. In the discussion of FIG. 4, it will be understood that the operations attributed to the tablet processing circuit 114 shall be understood to mean the tablet processing circuit 114 executing the BAS mapping tool 112 and any coincident services provided via the operation system 214. Similarly, the operations attributed to the server processing circuit 120 shall be understood to mean the processing circuit 120 executing the tablet mapping server 230 and any coincident services provided by the operating system 228 and web server 232. The operations attributed to the cloud processing circuit 126 shall mean the cloud processing circuit 126 operating in a conventional manner as a data management system. Data communications between the tablet processing circuit 114 and the server processing circuit 120 occur via their respective communication circuits 204, 220 and the Internet 50 (along with any intervening wireless networks, not shown). The server processing circuit 120 also employs the communication circuit 220 to communicate with the cloud processing circuit 126 via the Internet 50.

In step 402, the tablet processing circuit 114, responsive to appropriate user input on the input device 202, generates a URL request associated with the initial web page of the mapping server 230 of the server 104. The tablet processing circuit 114 causes the URL request to be communicated via the Internet 50, which in turn directs the request to the server processing circuit 120 in a conventional manner.

In step 404, the server processing circuit 120 receives the request, and generates and causes transmission of an initial web page back the tablet processing circuit 114. The initial web page includes an interactive page that includes a suitable form for receiving user input. identification and authentication. In step 406, the tablet processing circuit 114 displays the page, and receives user input including the user's identification and authentication information, such as a user name and password.

In step 408, the tablet processing circuit 114 causes the user identification and authentication information as an http request to be transmitted to the server processing circuit 120.

In step 410, the server processing circuit 120 receives the user identification and authentication information and determines whether the information corresponds to and user file $502_x$ (see FIG. 5) in the configuration database 234, and if so, whether the authentication information is correct. In the event that the answer in step 410 is in the negative, then server processing circuit 120 performs a failure routine (step 411), which may include suitable steps to allow for re-entry of the information in a conventional manner. In the event that the answer in step 410 is in the affirmative, then the server processing circuit 120 proceeds step 412.

In step 412, the server processing circuit 120 performs a database inquiry in configuration database 234 to determine the identification of each BAS that is associated with the user identification information. Thus, for example, with reference to FIG. 5, if the user identification information is "USER_1", then the server processing circuit 120 retrieves information from the record $502_1$ that indicates that BAS_1, BAS_3 and BAS_N are associated with USER_1. At the conclusion of step 412, the server processing circuit 120 has a set of BAS identifiers associated with the user. The server processing circuit 120 thereafter proceeds to step 414.

In step 414, the server processing circuit 120 formulates and transmits a data request to the cloud 106, requesting a first set of information stored in a stored file associated with each of the set of BAS identifiers. The first set of information includes a site name, a site address, the site geographical coordinates, and the overall site status. The overall site state information can include a value indicating if the site is "online" or "offline". A site is online if it is operational and communicating with the cloud 106. A site is "offline" is if it not operational and/or not communicating. Another useful site status would be "trouble", indicating that one or more values in the BAS, such as values provided by the sensors $109_1$ or $109_2$ of FIG. 1, are out of range. Still other useful site information can include an indication of an out of range power usage in the BAS.

In continuation of the example discussed above wherein the user identification is USER_1, the server processing circuit 120 in step 414 would provide an inquiry (and suitable authentication information) to the cloud processing circuit 126 requesting a first set of information stored in the files $236_1 \ldots 236_n$ in the file storage 124 associated with each of the sites identified as BAS_1, BAS_3 and BAS_N. Referring again generally to the discussion of FIG. 4, cloud processing circuit 126 receives the data inquiries in step 416.

After receiving the inquiry for the first set of information associated with each of the set of BAS identifiers in step 416, the cloud processing circuit 126 executes step 418. In step 418, the cloud processing circuit 126 retrieves the requested information by accessing the files $236_1, 236_2, \ldots 236_n$ in the data storage 124. After step 418, the cloud processing circuit 126 proceeds to step 420. In step 420, the cloud processing circuit 126 provides the retrieved first information corresponding to the set of BAS identifiers to the server processing circuit 120. In this embodiment, the cloud processing circuit 126 provides such information in a fat xml string format. The cloud processing circuit 126 provides the data in a fat xml string format to facilitate access to more comprehensive data by richer applications, not shown or discussed herein.

Continuing in the example discussed above wherein the user identification is USER_1, the cloud processing circuit 126 in step 416 would receive an inquiry for the first set of information associated with each of the BAS identifiers BAS_1, BAS_3 and BAS_N. In step 418, the cloud processing circuit 126 would retrieve the requested data from the files $236_1, 236_3$ and $236_n$ in the data storage 124. In step 420, the cloud processing circuit 126 would transmit the retrieved data in a fat xml string format to the server processing circuit 120.

Referring again to the general operation of FIG. 4, in step 422, the server processing circuit 120 receives the retrieved first set of information for each relevant BAS identifier from the cloud processing circuit 126. The server processing circuit 120 then executes step 424. In step 424, the server processing circuit 120 repackages the received information from the fat xml string format into a "thin" or ordinary xml string format, and forwards the information in the repackaged format to the tablet processing circuit 114. The tablet processing circuit 114 receives the forwarded information at step 426, and parses the xml string format to obtain the site name, site address, site geographical coordinates, and overall site status associated with each of the set of BAS identifiers determined in step 412, above.

Accordingly, in step 426, the tablet processing circuit 114 has received the first set of information (site name, side address, site geographical coordinates, and site overall status) for each of the BAS systems to which the user is entitled to access data. In the next few steps, the tablet processing circuit 114 develops inputs to the standard mapping function 216 to enable the display having the general appearance of the display screen 300 in FIG. 3A. As discussed above, the mapping function 216 is a standard function (i.e. run-time library function) available on many commercially available tablet (and other commercially available) computing devices.

The mapping function 216 has formatted inputs that allow another application to define the overall geographical boundaries of the map, geographical coordinates for "pin" or indicator placements on the map, and colors or shading for each pin. The mapping function 216 can also have formatted inputs for text to be associated with each "pin" or indicator placement. In such a case, the mapping function 216 further includes the functionality to display a pop-up window or balloon displaying such text upon receipt of a corresponding input from the input device 202. An example of a mapping function having such inputs is the mapping function models MKMapKit and CLLocation, available through the Apple iOS and described in the Apple iOS Documentation. Such mapping functions are readily implementable in the iPad family of devices available from Apple Inc. In any event, in the steps following step 426, the tablet processing circuit 114 develops such formatted inputs for the mapping function 216.

In particular, in step 428, the tablet processing circuit 114 first calculates a set of map geographical boundaries based on the site geographical coordinates in the information received in step 426. To this end, the tablet processing circuit 114 determines a set of geographical boundary coordinates defining a geographical area in which all of the site geographical coordinates in the information received in step 426 can be located. Moreover, the tablet processing circuit 114 determines the set geographical boundary coordinates such that zoom or scale of the map is reduced nearly as much as possible, while still containing all of the site geographical coordinates. Thus, for example, if the various site geographical coordinates span 100 square miles, then the tablet processing circuit 114 may determine a set of geographical boundary coordinates that includes those 100 square miles, but not significantly more. By contrast, if the various site coordinates span only 10 square miles, then the tablet processing circuit 114 may determine a set of geographical boundary coordinates that define an area that is significantly smaller. In general, the tablet processing circuit 114 attempts to maximize the zoom level of the map while still being able to place all of the sites on the map. By way of example, the tablet processing circuit 114 may defined the set of geographical boundary coordinates by using the northernmost, southernmost, easternmost, and westernmost coordinates of any of the obtain site geographical coordinates, After determining the set of geographical boundary coordinates in step 428, the tablet processing circuit executes step 430. In step 430, the tablet processing circuit 114 determines the color, shading, or other visual characteristic associated with each BAS identifier based on the overall site status information received in step 426. To this end, it will be appreciated that the overall site status information provided by the BAS control systems $108_1, 108_2, \ldots 108_n$ consists of one of finite set of status values. For example, one value may correspond to "online", one value may correspond to "requires attention", and another may correspond to "offline". The tablet processing circuit 114 uses a predefined association of color or shading to such status values in order to generate the color/shading values associated with each BAS identifier, based on the information received in step 426. In the non-limiting example described herein, the table processing circuit 114 associates the color green with the status of "online", the color red with the status of "offline", and the color yellow with the status of "requires attention". As discussed above, other colors may be used to indicate a status wherein power usage is out of range. Other indications may involve shading or blinking.

After determining the color/shading value for each relevant BAS in step 430, the tablet processing circuit 114 proceeds to step 432. In step 432, the tablet processing circuit 114 generates a formatted input to the map function 216. The formatted input includes the set of boundary geographical coordinates (from step 428), and, for each BAS identifier: the set of site geographical coordinates (received in step 426); the color/shading value (from step 430); the site name (received in step 426); and the site street address (received in step 426). The input is formatted such that the information for each BAS identifier is linked together.

After step 432, the tablet processing circuit 114 executes step 434. In step 434, the tablet processing circuit 436, renders a first display screen on the display 118 having the general features of the display screen 300 of FIG. 3A. With reference to FIG. 3A, the tablet processing circuit 114 generates the display screen such that it includes a map 302, pins 304$_1$ ... 304$_n$, the "list" button 306, and other text information. The tablet processing circuit 114 generates the map 302 and the pins 304$_1$ ... 304$_n$ by executing the mapping function 216. To this end, the mapping function 216, when executed by the tablet processing circuit 114, will provide an interactive map graphic (e.g. the map 302 of FIG. 3A), wherein the displayed map area has an area within the set of geographical boundary coordinates received in step 432, and has indicator pins 304$_1$ ... 304$_n$ located at corresponding parts of the map 302 based on the site geographical coordinates received in step 432. Furthermore the mapping function 216, when executed by the tablet processing circuit 114, further displays a pin color or shading for each pin 304$_1$ ... 304$_n$ based on the values received in step 432.

Thus, in step 434, the display 118 of the tablet 102$a$ will convey to the user a geographical depiction of the relative locations of the various sites to which the user has BAS data access (pins 304$_1$ ... 304$_n$), and a visual indication of the overall status of each site based on the color or shading of the pins 304$_1$ ... 304$_n$. This allows the user an intuitive overview of the status of the various sites owned, controlled, or otherwise monitored by the user in perspective to the locations of the sites.

After step 434, the tablet processing circuit 114 executes a number of steps to receive inputs from the user that allow the user to drill down and receive further information for particular sites, and/or to obtain a list view of all site information. To this end, the tablet processing circuit 114 employs operating system tools in a conventional manner to monitor for various inputs of the graphical user interface on the display 118. For example, it is known that in a tablet computing device, a user may select an interactive graphic element (e.g. a pin 304$_x$) tapping a portion of the input device 202 (which is also part of the display 118) at a location in which such a graphic element appears.

In particular, in step 436, the tablet processing circuit 114 determines whether it has received an input signal indicating user selection the "list" button 306. If not, then the tablet processing circuit 114 proceeds to step 438. If so, however, then the tablet processing circuit 114 proceeds to step 602 in FIG. 6.

Figure 6:
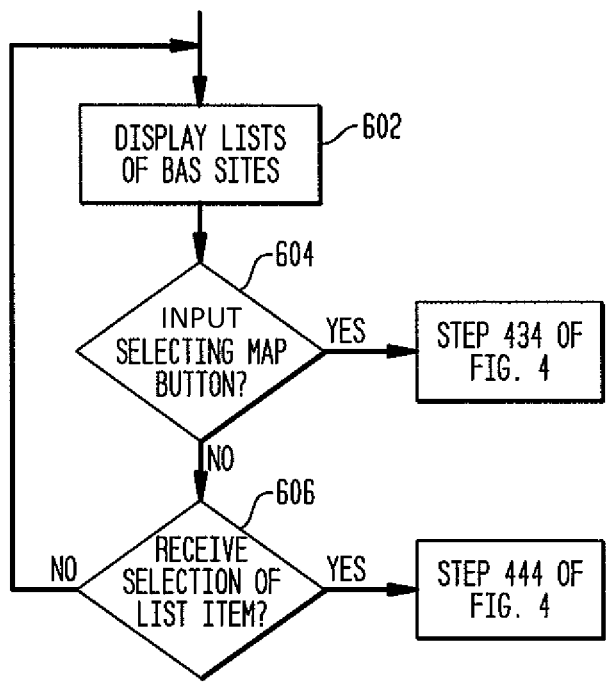
FIG. 6 shows a flow diagram of an exemplary set of operations that may be carried out by the computing device of the arrangement of FIG. 2.
Figure 7:
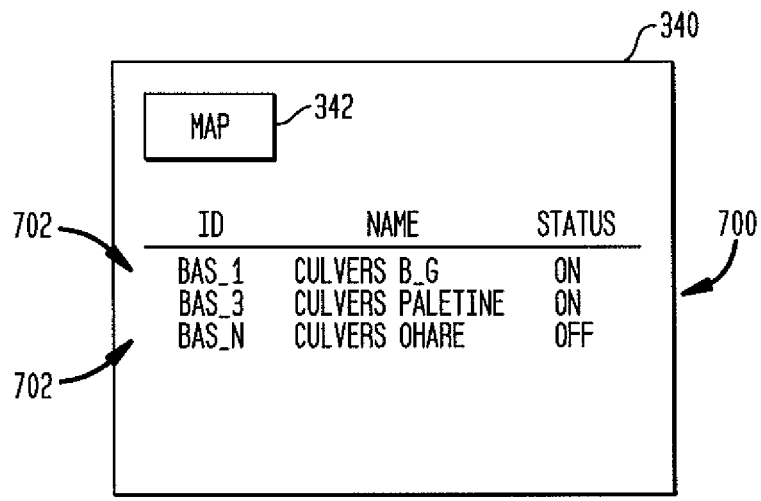
FIG. 7 shows another exemplary display screen generated by the computing device of the arrangement of FIG. 2.

Referring to FIG. 6, in step 602, the tablet processing circuit 114 causes a display of a list of BAS sites. FIG. 7 displays a display screen 340 that includes an example of such a list 700, along with other features, such as a "map" button 342. In the list 700, each row 702 of the list corresponds to a BAS identifier. Each row 702 may suitably contain the BAS identifier, the corresponding site name, and the site status. The tablet processing circuit 114 monitors the input device 202 in a conventional manner to determine whether the user has provided input to the display screen 340. Accordingly, in step 604, the tablet processing circuit 114 determines whether the input device 202 has received input signals indicating selection of the button 342 to toggle back to the map view. If so, then the tablet processing circuit 114 returns to step 434 of FIG. 4. If not, however, then the tablet processing circuit proceeds to step 606.

In step 606, the tablet processing circuit 114 determines whether it has received an input indicating the selection of a specific BAS to view in further detail. In particular, the tablet processing circuit 114 determines whether signals from the input device 202 correspond to the selection of an item (i.e. a row 702) from the list 700. If so, then the tablet processing circuit 114 identifies the selected BAS identifier (based on location of the cursor at the time of selection) and proceeds to step 444 of FIG. 4C.

Referring again to FIG. 4 and general description from the map view display screen, in step 438, the tablet processing circuit 114 determines whether the input device 202 has received signals indicative that an input pointer (i.e. a finger) on the display 118 has been moved over pin or indicator on the map, for example, over any of the pins 304$_x$ on the map 302. If not, then the tablet processing circuit 114 returns to step 434. If so, however, then the tablet processing circuit 114 proceeds to step 440.

In step 440, the tablet processing circuit 114 causes a bubble (i.e. a pop-up small graphic) to be displayed above or beside the selected pin 304$_x$. The tablet processing circuit 114 displays within the bubble text information related to the BAS identifier associated with the pin 304$_x$. The text information can include the site name and site address. Thus, for example, if the input pointer has been rolled over the pin 304$_2$, which is associated with the BAS identifier BAS_2, then the tablet processing circuit 114 causes the site name information and the site address information associated with BAS_2 to appear in the displayed bubble. After display of the bubble and text information in step 440, the tablet processing circuit 114 proceeds to step 442.

In step 442, the tablet processing circuit 114 determines whether the input device 202 has provided an additional signal indicating that the user has selected the pin 304$_x$ for which the bubble is displayed. From the user's perspective, the user employs the input device 202 to manipulate a pointing element (such as the user's finger) over a pin (e.g. pin 304$_2$) to display the bubble, and then taps the screen or otherwise provides additional input indicating that further information associated with the BAS identifier (e.g. BAS_2). If the tablet processing circuit 114 determines that a pin 304$_x$ associated with a BAS identifier BAS_x has been selected, then the tablet processing circuit 114 proceeds to step 446. Otherwise, the tablet processing circuit 114 returns to step 434.

In step 444, the tablet processing circuit 114 causes transmission of a signal to the server processing circuit 120 requesting a second set of data for the BAS identifier selected in step 442. In step 446, the server processing circuit 114 receives the request. Thereafter, in step 448, the server processing circuit 114 generates a request for the second set of data for the selected BAS identifier and transmits the same to the cloud processing circuit 126. In step 450, the cloud processing circuit 126 receives the request.

Thereafter, in step 452, the cloud processing circuit 126 retrieves the data record 236$_x$ for the selected BAS identifier BAS_x and obtains a second set of system data from the data record 236$_x$. Such data can include comprehensive system data, such as temperature measurements, light status (on/off), fan status (on/off), temperature set points, alarm indicators and the like. Once the second set of data is retrieved in step 452, the cloud processing circuit 126 proceeds to step 454. In step 454, the cloud processing circuit 126 transmits the second set of data to the server processing circuit 120 in a fat xml string format.

In step 456, the server processing circuit 120 receives the second set of data in the fat xml format. Thereafter, in step 458, the server processing circuit 120 repackages the second set of data into a thin or ordinary xml format and transmits the repackaged data to the tablet processing circuit 114. In step 460 the tablet processing circuit 114 receives the xml formatted string and parses the string to obtain the second set of data for the BAS identifier corresponding to the pin selected in step 442. The tablet processing circuit 114 then proceeds to step 462.

In step 462, the tablet processing circuit 114 causes the display of the detailed system view display screen, such as the display screen 320 of FIG. 3B, using the values received in step 460. The tablet processing circuit 114 thereafter monitors the input device 202 for signals indicating a selection on the system view display screen (e.g. display screen 320 of FIG. 3B).

In particular, in step 464, the tablet processing circuit 114 determines whether the input device 202 has received input signals indicating selection of the button 332 to toggle back to the map view (e.g. FIG. 3A). If so, then the tablet processing circuit 114 returns to step 434. If not, however, then the tablet processing circuit proceeds to step 466.

In step 466, the tablet processing circuit 114 determines whether it has received an input indicating that the user has entered a value to command a point (i.e. a device) in the BAS for which data is displayed. In particular, the tablet processing circuit 114 determines whether signals from the input device 202 correspond to the input of a command. The receipt of input for commanding points may be received in a plurality of conventional ways. By way of example, the processing circuit 114 may provide, upon selection of temperature set point value 326, a dialog box (not shown) in which entry of a new temperature set point may be received. In another example, selection of any on/off status indicator on the display screen 320, such as the light status indicator 330, may be employed as a command toggling the corresponding status from its existing status to the other status (i.e. from "on" to "off").

If the tablet processing circuit 114 receives a command input via the input device 202, then the tablet processing circuit 114 proceeds to step 468. Otherwise, the tablet processing circuit 114 returns to step 464.

In step 468, the tablet processing circuit 114 transmits to the server processing circuit 120 a message corresponding to the command input received in step 466. To this end, the message includes the BAS identifier, a point identifier, and the command value. A point identifier, as is known in the art, is an identifier of a specific BAS system value. In step 470, the server processing circuit 120 receives the message and formulates a corresponding message to transmit to the cloud processing circuit 126. In step 472, the server processing circuit 120 transmits the corresponding message. The message is received by the cloud processing circuit 126 in step 474. The cloud processing circuit 126 thereafter proceeds to step 476.

In step 478, the cloud processing circuit 126 retrieves the data record $236_x$ corresponding the BAS identifier in the received message, and stores the command input information in the portion of the data record $236_x$ corresponding to the point identified in the received message. The new command information will then be obtained by the corresponding BAS control station $108_x$ in the next update communication between the BAS control station $108_x$ and the cloud processing circuit 126.

With reference to FIG. 3A, for example, it will be appreciated that the display screens such as the display screen 300 (and display screens 320, 340) provide various other selectable icons and menus to provide a normal interactive capability. For example, the display screens 300, 320, etc. provide suitable elements to allow the user to end the session. Other elements allow the user to zoom in and out (i.e. change the scale) of the map 302 of FIG. 3A. Such capabilities are typically inherent to the map function 216.

It is therefore apparent that the above-described embodiment provides an intuitive and convenient method for a user to monitor the status of various BAS sites from an ordinary portable computing device having wireless capability. It will be appreciated that the embodiments described herein may be enhanced by using GPS capabilities within the tablet 102a to allow the tablet processing circuit 114 to display the user's location within the map 302 in addition to the pins $304_1 \ldots 304_n$. It will further be appreciated that with such capability, the distance between the user and the various BAS sites may be calculated. Such information may be provided in the list view displayed in step 602. Moreover, the processing circuit 114 may be configured to display the list in step 602 in order by distance to each location/site.

As discussed above, the functionality described herein may readily be adapted for distributed systems other than building control systems. Many such distributed systems, particularly those that having control panels, controllers or other supervisory devices that monitor the status of sensors, and/or provide commands to actuators or the like. Such control panels, controllers and supervisory devices may readily be configured to provide comprehensive data to a cloud such as the cloud 106. The embodiments described herein allow for portable computing devices to generate maps and visualizations of status data from various geographically dispersed systems, and allow for a user at a portable computer device to alter command values or parameters for a plurality of geographically dispersed actuators. It will further be appreciated that by geographically dispersed, it is meant that the systems are physically spaced apart, such that they are capable of being mapped in different locations on a graphical map of one or more scales.

It will further be appreciated that the above-describe embodiments are merely exemplary, and that those of ordinary skill in the art may readily devise their own implementations and adaptations that incorporate the principles of the present invention and fall within the spirit and scope thereof.

We claim:

1. A method, comprising:
   receiving into a processing circuit from a requesting device via the Internet first identification information;
   using the processing circuit to identify a plurality of geographically dispersed systems associated with the first identification information;
   generating a data inquiry to a data system, the data inquiry including information identifying each of the plurality of geographically dispersed systems;
   obtaining information from the data system for each of the plurality of geographically dispersed systems in a fat XML string format which is repackaged by the processing circuit into a thin XML string format, resulting in a second mark-up language format, such information including geographical coordinates and system status information; and
   transmitting the obtained information via the Internet to the requesting device in the second mark-up language format.

2. The method of claim 1, wherein the data system is a cloud computing system.

3. The method of claim 1, wherein each of the plurality of geographically dispersed
   systems comprises a building automation system including a building automation system
   control device.

4. The method of claim 1, wherein upon receiving the obtained information via the Internet, the requesting device parses the second mark-up language format to obtain information associated with each of the plurality of geographically dispersed systems.

5. A method for execution on a computing device, comprising:
   transmitting first identification information to a server processing circuit via the Internet, the server processing circuit configured to determine a plurality of geographically dispersed systems based on the first identification information;

receiving from the server processing circuit, via the Internet, information for each of the plurality of geographically dispersed systems in a second mark-up language format, the second mark-up language format resulting from the server processing circuit repacking data received from a data system in a first mark-up language format, which is a fat XML string format, into a thin XML string format, such information including geographical coordinates and system status information corresponding to each of the plurality of geographically dispersed systems;

determining a set of geographical boundary coordinates defining a geographical area containing a plurality of the geographical coordinates;

determining for each system of the plurality of geographically dispersed systems a visible characteristic value based on the corresponding system status information; and employing a map presentation function executed by a second processing circuit to display a map based on the geographic boundary coordinates, and to display a plurality of visible indicators on the map, each of the plurality of visible indicators having a position on the map corresponding the geographical coordinates of a corresponding system of the plurality of geographically dispersed systems, each of the plurality of visible indicators having a visible characteristic corresponding to the visible characteristic value of the corresponding system.

6. The method of claim 5 wherein the second processing circuit is disposed within a housing of a tablet computing device.

7. The method of claim 6, wherein the transmitting step further comprises: transmitting the first identification information wirelessly to the server processing circuit.

8. The method of claim 5, further comprising:

detecting an input signal indicating a selection of a first system of the plurality of geographically dispersed systems;

transmitting an identifier of the first system to the server processing circuit;

receiving from the server processing circuit measurement values and set point values of the first system;

removing the map from the display; and displaying the received measurement values and set point values of the first system.

9. The method of claim 8, further comprising:

detecting an input signal indicating a command value for a point within the first system, the command value configured to alter an operation of the first system;

transmitting an identifier of the first system, a point identifier, and a command value to the server processing circuit.

10. A method, comprising:

receiving into a processing circuit from a requesting device via the Internet first identification information;

using the processing circuit to identify a plurality of building automation systems associated with the first identification information;

generating a data inquiry to a data system, the data inquiry including information identifying each of the plurality of building automation systems;

obtaining information from the data system for each of the plurality of building automation systems in a fat XML string format which is repackaged by the processing circuit into a thin XML string format, resulting in a second mark-up language format, such information including geographical coordinates and system status information; and transmitting the obtained information via the Internet to the requesting device in the second mark-up language format.

11. The method of claim 10, further comprising, providing to the requesting device computer software instructions that, when executed by a processing circuit cause the processing circuit to:

receive the obtained information;

determine a set of geographical boundary coordinates defining a geographical area containing a plurality of the geographical coordinates;

determine for each system of the plurality of building automation systems a visible characteristic value based on the corresponding system status information; and employ a map presentation function to display a map based on the geographic boundary coordinates, and to display a plurality of visible indicators on the map, each of the plurality of visible indicators having a position on the map corresponding the geographical coordinates of a corresponding system of the plurality of building automation systems, each of the plurality of visible indicators having a visible characteristic corresponding to the visible characteristic value of the corresponding system.

12. The method of claim 10, wherein the data system is a cloud computing system.

13. The method of claim 10, wherein upon receiving the obtained information via the Internet, the requesting device parses the second mark-up language format to obtain information associated with each of the plurality of building automation systems.

* * * * *